(12) United States Patent
Shimizu

(10) Patent No.: US 12,240,324 B2
(45) Date of Patent: Mar. 4, 2025

(54) DISPLAY CONTROL DEVICE, DISPLAY DEVICE, VEHICLE, METHOD, AND STORAGE MEDIUM

(71) Applicant: TOYOTA JIDOSHA KABUSHIKI KAISHA, Toyota (JP)

(72) Inventor: Ryusuke Shimizu, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 17/932,758

(22) Filed: Sep. 16, 2022

(65) Prior Publication Data
US 2023/0106754 A1    Apr. 6, 2023

(30) Foreign Application Priority Data
Oct. 1, 2021    (JP) .................................. 2021-163033

(51) Int. Cl.
| | |
|---|---|
| *B60K 35/00* | (2024.01) |
| *B60K 35/10* | (2024.01) |
| *B60K 35/22* | (2024.01) |
| *B60K 35/28* | (2024.01) |
| *B60S 1/48* | (2006.01) |
| *G06F 3/14* | (2006.01) |

(52) U.S. Cl.
CPC ................ *B60K 35/00* (2013.01); *B60S 1/48* (2013.01); *G06F 3/14* (2013.01); *B60K 35/10* (2024.01); *B60K 35/22* (2024.01); *B60K 35/28* (2024.01); *B60K 2360/1434* (2024.01); *B60K 2360/16* (2024.01)

(58) Field of Classification Search
CPC ........ B60K 35/00; B60K 35/10; B60K 35/22; B60K 35/28; B60K 2360/1434; B60K 2360/16; B60K 2360/1438; B60K 2360/1442; B60K 2360/171; B60K 2360/178; B60K 2360/48; B60S 1/48; B60S 1/481; B60S 1/485; B60S 1/56; G06F 3/14; G09G 3/20; G09G 2354/00; G09G 2380/10
See application file for complete search history.

(56) References Cited

U.S. PATENT DOCUMENTS

| | | | |
|---|---|---|---|
| 11,724,558 B2 * | 8/2023 | Jackson ................ | B60S 1/0848 134/18 |
| 2009/0174537 A1 * | 7/2009 | Rovik .................... | B60K 35/22 340/438 |

(Continued)

FOREIGN PATENT DOCUMENTS

| | | | | |
|---|---|---|---|---|
| EP | 3958105 A1 * | 2/2022 | ........... | G06F 1/1652 |
| JP | 2007269247 A | 10/2007 | | |

(Continued)

*Primary Examiner* — Tyler J Lee
*Assistant Examiner* — Matthew John Moscola
(74) *Attorney, Agent, or Firm* — Dickinson Wright, PLLC

(57) ABSTRACT

A display control device installed in a vehicle includes a receiving unit that receives information concerning dirt of a vehicle-mounted sensor installed in the vehicle, and a control unit that controls display of a wash execution button displayed on a display device installed in the vehicle for executing washing of the vehicle-mounted sensor, based on the information concerning the dirt received by the receiving unit.

10 Claims, 7 Drawing Sheets

(56) References Cited

U.S. PATENT DOCUMENTS

| | | | |
|---|---|---|---|
| 2011/0035144 A1* | 2/2011 | Okamoto | G01C 21/3641 |
| | | | 701/532 |
| 2012/0265416 A1* | 10/2012 | Lu | B60W 30/09 |
| | | | 348/148 |
| 2012/0266926 A1* | 10/2012 | Kikuta | B60S 1/0848 |
| | | | 134/58 R |
| 2013/0037627 A1 | 2/2013 | Kikuta et al. | |
| 2016/0272163 A1* | 9/2016 | Dreiocker | H04N 23/811 |
| 2017/0072850 A1* | 3/2017 | Curtis | B60W 50/0097 |
| 2017/0105595 A1* | 4/2017 | Lambert | G06F 3/14 |
| 2018/0043863 A1* | 2/2018 | Singer | B60K 5/00 |
| 2018/0232097 A1* | 8/2018 | Kneuper | G08G 5/0052 |
| 2019/0250006 A1* | 8/2019 | Lu | G01C 21/3661 |
| 2019/0315353 A1 | 10/2019 | Dakemoto | |
| 2020/0110407 A1* | 4/2020 | Miura | B60W 50/14 |
| 2020/0159368 A1* | 5/2020 | Han | G06F 21/32 |

FOREIGN PATENT DOCUMENTS

| | | |
|---|---|---|
| JP | 2013011376 A | 1/2013 |
| JP | 2013082358 A | 5/2013 |
| JP | 2019182328 A | 10/2019 |
| JP | 2020086787 A | 6/2020 |
| JP | 2022080147 A | 5/2022 |

* cited by examiner

DISPLAY CONTROL DEVICE, DISPLAY DEVICE, VEHICLE, METHOD, AND STORAGE MEDIUM

CROSS-REFERENCE TO RELATED APPLICATION

This application claims priority to Japanese Patent Application No. 2021-163033 filed on Oct. 1, 2021 and Japanese Patent Application No. 2022-011248 filed on Jan. 27, 2022, each incorporated herein by reference in its entirety.

BACKGROUND

1. Technical Field

The disclosure relates to a display control device and the like installed in a vehicle.

2. Description of Related Art

When implementing vehicle traveling controls, such as driver assistance and automatic driving, it is essential to maintain the detection performance of sensors, cameras, etc. (hereinafter collectively referred to as "vehicle-mounted sensors").

A washing device for a vehicle that washes a vehicle-mounted camera is disclosed in Japanese Unexamined Patent Application Publication No. 2013-082358 (JP 2013-082358 A). The vehicular washing device displays an image captured by the vehicle-mounted camera on a display, and also displays a touch panel switch (software switch) for camera washing. Then, the vehicular washing device washes a glass window of the vehicle-mounted camera when the touch panel switch is operated by the driver.

SUMMARY

However, according to the technology described in JP 2013-082358 A, the touch panel switch for camera washing is displayed when the vehicle is in a rearward drive state. Thus, the touch panel switch is displayed even when the vehicle-mounted camera is only slightly dirty and does not require washing, which may cause the user to feel annoyed. Since the touch panel switch is always displayed when the vehicle is in the rearward drive state, the user himself/herself, such as the driver, needs to determine the necessity of washing, based on the image captured by the vehicle-mounted camera and displayed on the display.

The disclosure provides a display control device and the like capable of performing display of a software switch for executing washing of a vehicle-mounted sensor at more appropriate times and in a more appropriate mode.

A display control device installed in a vehicle according to one aspect of the disclosure includes a receiving unit configured to receive information concerning dirt of a vehicle-mounted sensor installed in the vehicle, and a control unit configured to control display of a wash execution button displayed on a display device installed in the vehicle for executing washing of the vehicle-mounted sensor, based on the information concerning the dirt received by the receiving unit.

According to the disclosure, the display control device capable of performing display of a software switch for executing washing of the vehicle-mounted sensor at more appropriate times and in a more appropriate mode can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A display control device installed in a vehicle of this disclosure controls display of a wash execution button on a display device based on the dirt status of a vehicle-mounted sensor. This makes it possible to display the wash execution button for the vehicle-mounted sensor on the display device at more appropriate times and in a more appropriate mode. In the following, one embodiment of the disclosure will be described in detail with reference to the drawings.

EMBODIMENT

Configuration

Figure 1:
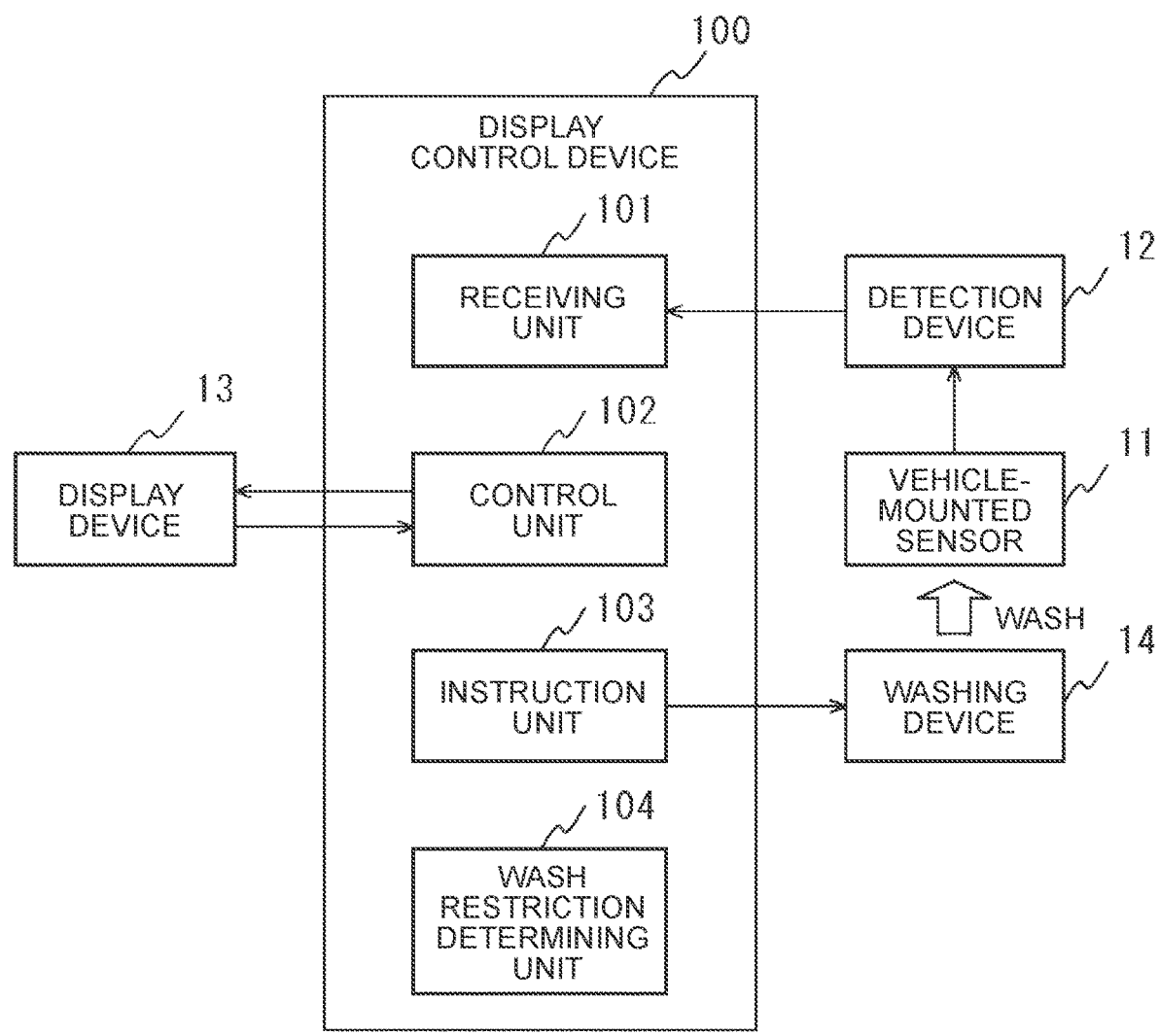
FIG. 1 is a schematic view of functional blocks of a display control device according to one embodiment and its peripherals.

FIG. 1 is a schematic view of functional blocks of a display control device 100 according to one embodiment of the disclosure and its peripherals. The functional blocks illustrated in FIG. 1 include a vehicle-mounted sensor 11, detection device 12, display device 13, washing device 14, and display control device 100. The display control device 100 is communicatively connected to the detection device 12, the display device 13, and the washing device 14. In FIG. 1, the solid arrows indicate directions in which instructions, data, etc. are transmitted.

The vehicle-mounted sensor 11 is, for example, a camera installed in the vehicle. In this embodiment, the vehicle-mounted sensor 11 is a rear-view monitor camera installed in a trunk lid or tailgate at the rear of the vehicle to capture images of the rear of the vehicle. However, the vehicle-mounted sensor 11 is not limited to this, but may be a camera that captures images of the front of the vehicle.

The detection device 12 is a device that detects dirt of the vehicle-mounted sensor 11. The detection device 12 detects dirt on the lens of the vehicle-mounted sensor 11 in the form of a vehicle-mounted camera, for example, based on the image captured by the vehicle-mounted sensor 11. The dirt of the vehicle-mounted sensor 11 can be detected, for example, based on change in the luminance between adjacent pixels. For example, the detection device 12 can determine that there is dirt on the vehicle-mounted sensor 11 when the difference in luminance between the pixels is equal to or larger than a predetermined value. When there is dirt on a specified area or more of the image taken by the vehicle-mounted sensor 11, the detection device 12 can determine that there is dirt that needs to be washed. The detection device 12 can also determine the degree of the detected dirtiness of the vehicle-mounted sensor 11. The degree of the dirtiness of the vehicle-mounted sensor 11 can be determined as "dirt level 1", for example, when the area of the image in which the difference in luminance between adjacent pixels is equal to or larger than the predetermined value is equal to or larger than a first area (the above-mentioned specified area) and smaller than a second area, and can be determined as "dirt level 2" when the area is equal to or larger than the second area. The degree of the dirtiness may be classified into three or more levels. When the detection device 12 determines that there is dirt that needs to be washed, on the vehicle-mounted sensor 11, it sends dirt detection information (including the dirt level, or the like, as information concerning the degree of dirtiness, as needed) to a receiving unit 101 (that will be described later) of the display control device 100. The detection device 12 may be incorporated in the vehicle-mounted sensor 11, or may be installed in the vehicle separately from the vehicle-mounted sensor 11.

The display control device 100 is installed in the vehicle, and controls display of the display device 13 based on the dirt detection information on the vehicle-mounted sensor 11. The display control device 100 also instructs the washing device 14 to wash the vehicle-mounted sensor 11 based on operation of the display device 13 by the user. The display control device 100 includes at least the receiving unit 101, a control unit 102, and an instruction unit 103, and may further include a wash restriction determining unit 104.

The receiving unit 101 is communicatively connected to the detection device 12, and receives the dirt detection information on the vehicle-mounted sensor 11 from the detection device 12. The manner of connection between the receiving unit 101 and the detection device 12 is not limited to any particular one, but may be either wired connection or wireless connection.

The wash restriction determining unit 104 determines whether the vehicle is in a state where washing of the vehicle-mounted sensor 11 is inhibited by the vehicle traveling control, or whether the vehicle is in a state where the washing effect is sufficiently obtained. The state where washing of the vehicle-mounted sensor 11 is inhibited is, for example, the case where the vehicle-mounted sensor 11 is being used under the vehicle traveling control in progress, more specifically, the case where the vehicle is in lane change or is about to change lanes. The state where the washing effect is sufficiently obtained is, for example, a state in which the dirt that adhered to the vehicle-mounted sensor 11 can be sufficiently washed by the washing device 14, and there is little risk that dirt adheres to the vehicle-mounted sensor 11 immediately after washing due to the surrounding environment of the vehicle. The method of determining whether the washing effect can be sufficiently obtained is not limited to any particular method, but it may be determined based on the dirt detection information or the information of images taken by the vehicle-mounted sensor 11, or may be determined based on sensing information of other vehicle-mounted sensors. The state where washing of the vehicle-mounted sensor 11 is inhibited, and the state where the washing effect cannot be sufficiently obtained will be called "wash restricted state". The wash restriction determining unit 104 may be omitted.

The control unit 102 performs control for displaying the wash execution button on the display device 13 (display/non-display switching control) and control for highlighting the display (display mode change control), based on the dirt detection information received by the receiving unit 101 from the detection device 12. The wash execution button is a button for executing washing of the vehicle-mounted sensor 11, and is one of software switches selectably presented to the user via the display device 13. Thus, the wash execution button can be displayed only when the vehicle-mounted sensor 11 needs to be washed, and the wash execution button displayed can be highlighted. It is, however, to be noted that the display control of the wash execution button is performed when the display or highlighting of the wash execution button is permitted in advance by the user (when the wash SW display setting is ON). On the other hand, when the display or highlighting of the wash execution button is not permitted (when the wash SW display setting is OFF), the control unit 102 does not perform control for displaying and highlighting the wash execution button even when the receiving unit 101 receives the dirt detection information. When the wash restriction determining unit 104 determines that the vehicle is in the wash restricted state, too, the control unit 102 does not perform control for displaying and highlighting the wash execution button. Thus, the wash execution button can be displayed, or its display can be highlighted, only when washing is feasible and the washing effect can be sufficiently obtained.

The instruction unit 103 is communicatively connected to the washing device 14 installed in the vehicle, and instructs the washing device 14 to wash the vehicle-mounted sensor 11. Specifically, when it is detected that the user has selected the wash execution button displayed on the display screen of the display device 13, the instruction unit 103 instructs the washing device 14 to wash the vehicle-mounted sensor 11.

The display control device 100 as described above, in part or in whole, can be composed of an electronic control unit (ECU), which typically includes a processor, such as a microprocessor, memory, input/output interfaces, etc. The electronic control unit can implement a part or all of the functions performed by the receiving unit 101, control unit 102, instruction unit 103, and wash restriction determining unit 104, by causing the processor to read and execute programs stored in the memory.

The display device 13 is a human machine interface (HMI), such as a car navigation system, which is installed in a vehicle and communicatively connected to the display control device 100. The method of connecting the display device 13 and the display control device 100 is not limited to any particular method, but an existing, in-vehicle network, such as a controller area network (CAN), can be used, for example. In FIG. 1, the display device 13 and the display control device 100 are separately configured, but the display device 13 may be configured to include the display control device 100.

When the display device 13 receives a display request to display the wash execution button from the control unit 102 of the display control device 100, it displays the wash execution button on the display screen of the display device 13. Also, when the display device 13 receives a highlighting request to highlight the wash execution button already displayed, from the control unit 102 of the display control device 100, it displays the wash execution button on the display screen of the display device 13 while performing predetermined highlighting operation on the button. The highlighting operation will be described later.

Figure 2A:
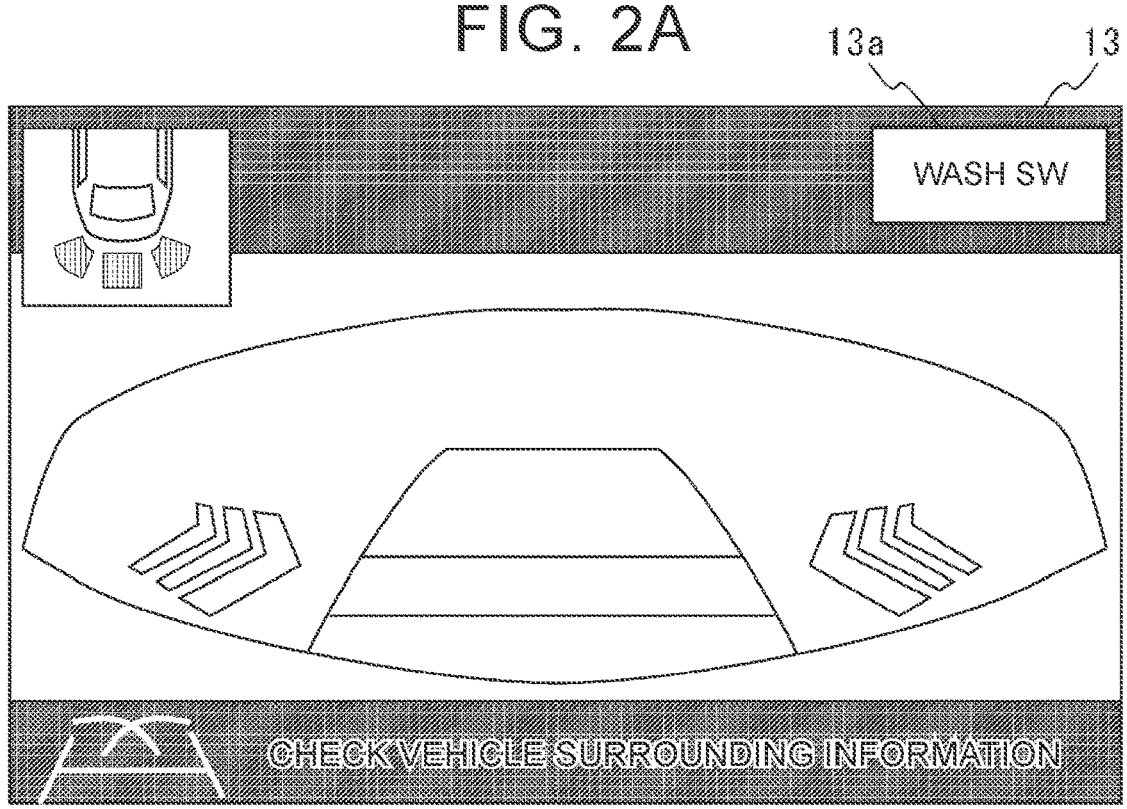
FIG. 2A is a view showing one example of a screen display of a display device.
Figure 2B:
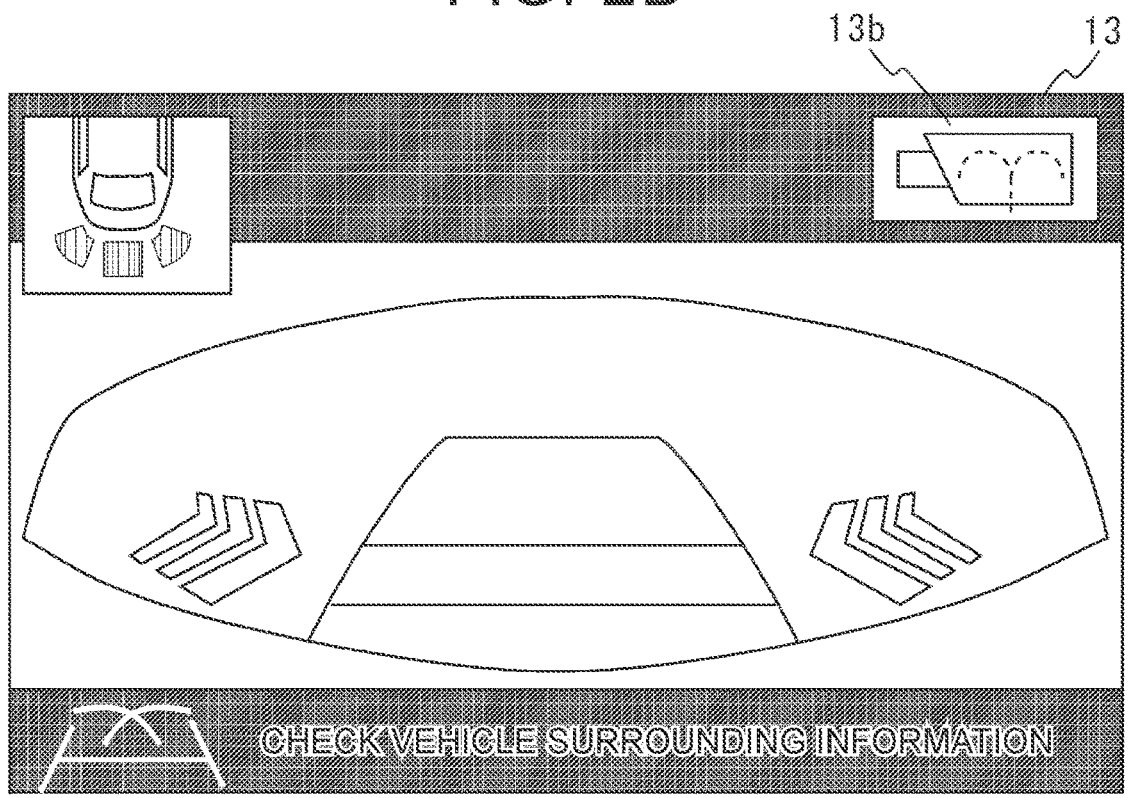
FIG. 2B is a view showing one example of a screen display of the display device.

FIG. 2A and FIG. 2B are views each showing one example of screen display on the display device 13. As shown in FIG. 2A and FIG. 2B, the wash execution button (a text display switch 13*a* in FIG. 2A, an icon display switch 13*b* in FIG. 2B) may be superimposed on the image captured by the vehicle-mounted sensor 11. In the examples of FIG. 2A and FIG. 2B, the wash execution button is displayed in the image captured by a camera for rear-view monitoring. With the captured image of the vehicle-mounted sensor 11 and the wash execution button thus displayed at the same time, the user himself/herself can determine the necessity of execution of washing. If the wash SW display setting is in the ON state and the vehicle is not in the wash restricted state when the receiving unit 101 receives the dirt detection information, the wash execution button may be displayed even during traveling of the vehicle, and the displayed wash execution button may be highlighted. When the vehicle-mounted sensor 11 is a camera for rear-view monitoring, and it is assumed that the dirt detection information is received, and the wash SW display setting is ON, the wash execution button may be superimposed on the image captured by the vehicle-mounted sensor 11 or the superimposed wash execution button may be highlighted at the time when the vehicle is placed in the rearward drive state.

The washing device 14 performs washing of the vehicle-mounted sensor 11, according to the instruction of the instruction unit 103. The washing device 14 includes, for example, a tank that contains washing liquid, a pump that pumps the washing liquid out of the tank, and a washing nozzle through which the pumped washing liquid is jetted toward the vehicle-mounted sensor 11. The pump is switched ON and OFF in operation by a relay, for example. The pump is connected to the washing nozzle via a hose, and a jet outlet of the washing nozzle is provided in a rear portion of the vehicle in the vicinity of the vehicle-mounted sensor 11. While the method of connecting the washing device 14 and the display control device 100 is not limited to any particular method, the washing device 14 and the display control device 100 are connected via an in-vehicle network, such as Ethernet (registered trademark) or low-voltage differential signaling (LVDS). In this embodiment, the washing device 14 is connected to the display control device 100 such that they can directly communicate with each other. However, the washing device 14 may be connected to the display control device 100 via the detection device 12 or the vehicle-mounted sensor 11, for example.

Control Process

Figure 3:
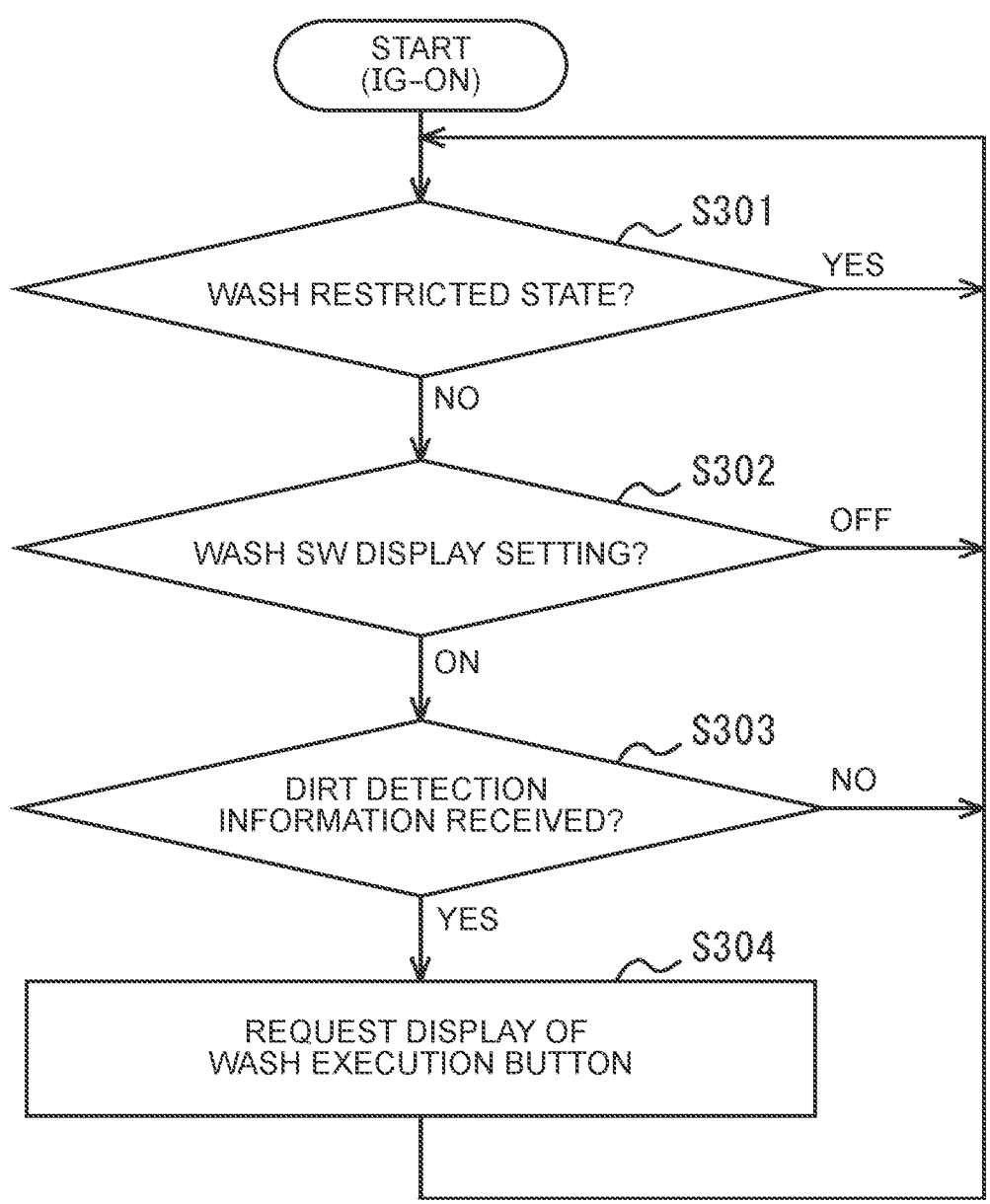
FIG. 3 is a processing flowchart of a first example of wash execution button display control.
Figure 4:
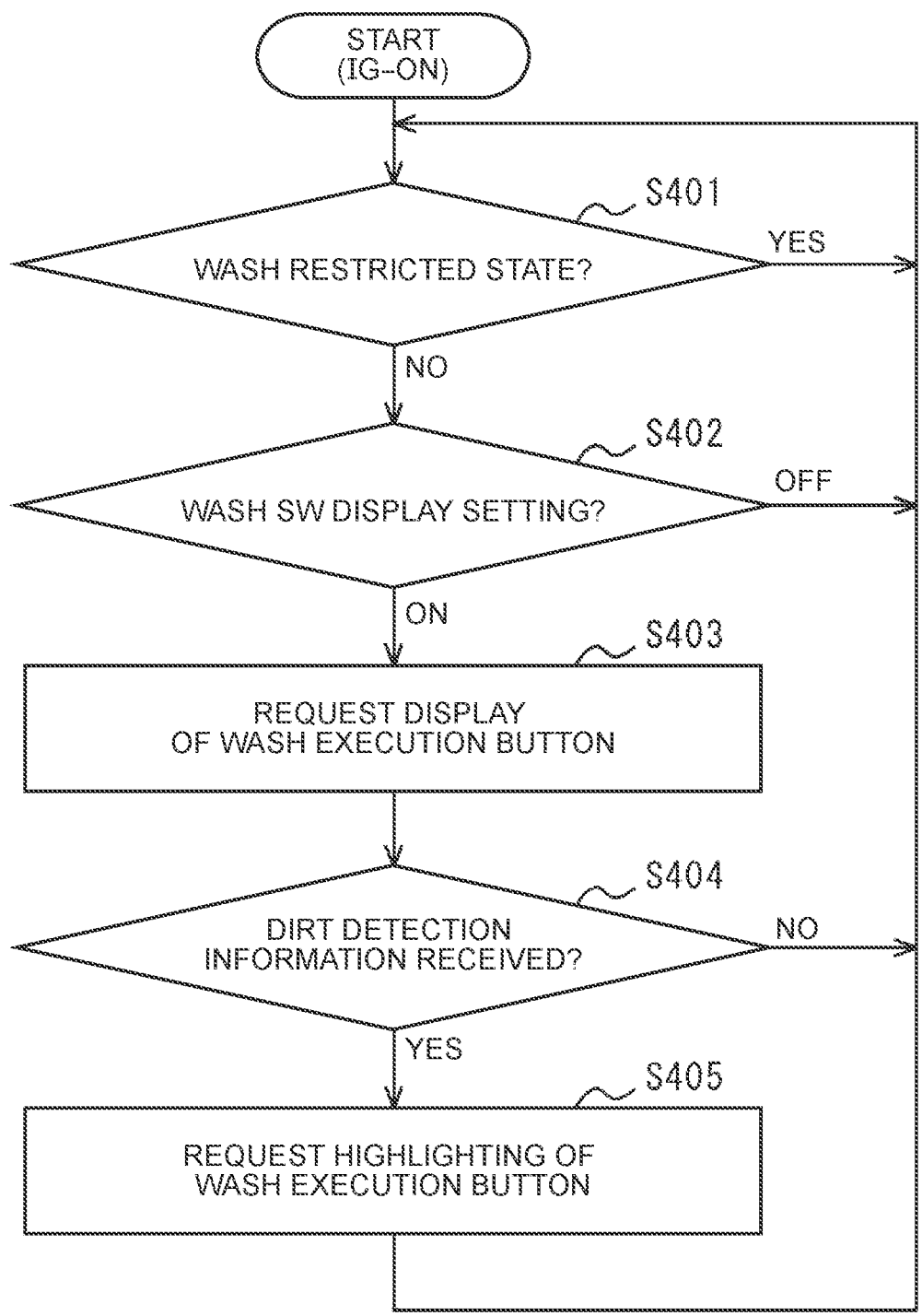
FIG. 4 is a processing flowchart of a second example of wash execution button display control.
Figure 5:
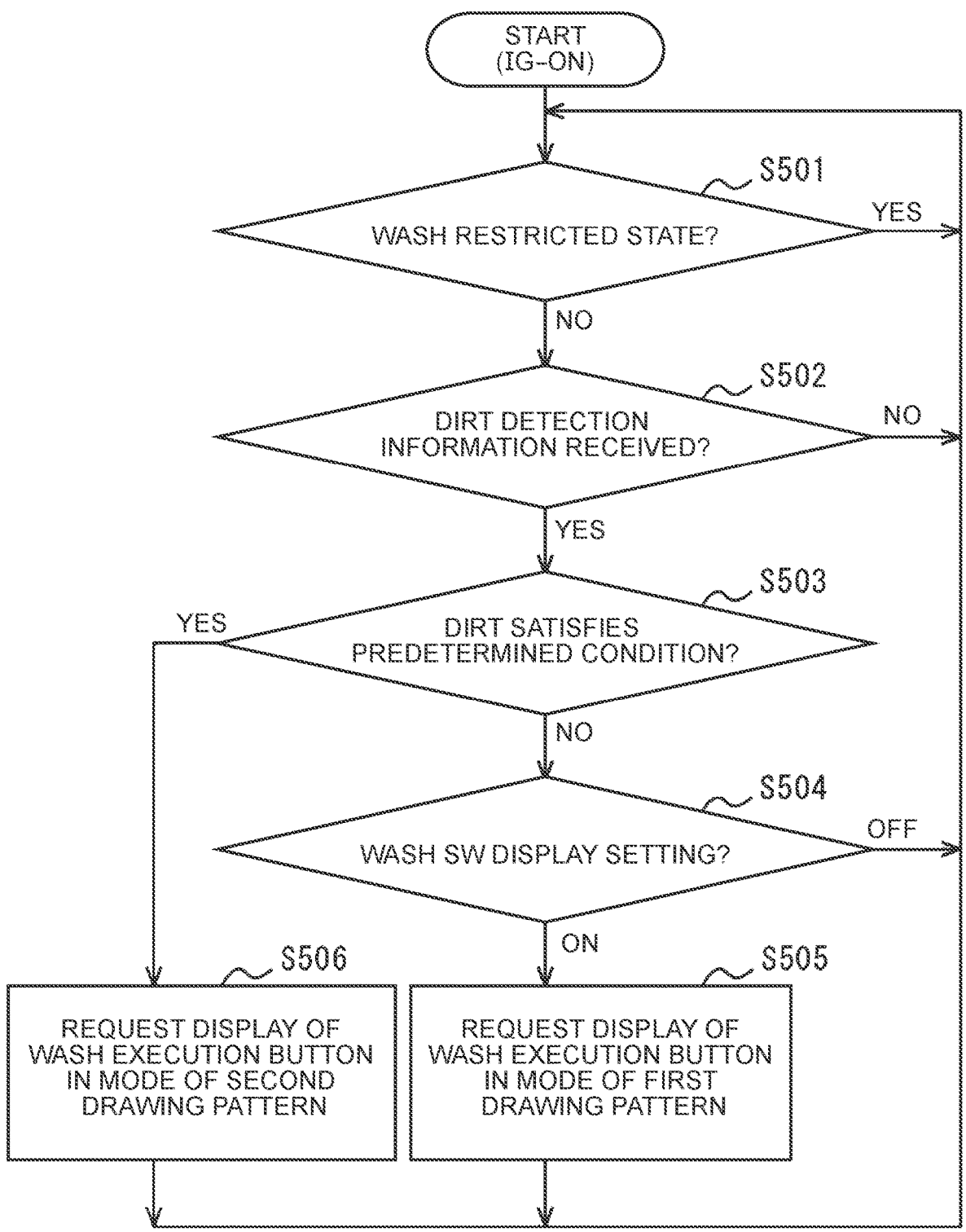
FIG. 5 is a processing flowchart of a third example of wash execution button display control.

Referring further to FIG. 3 to FIG. 5, some specific examples about control performed by the display control device 100 will be described.

(1) First Example

FIG. 3 is a processing flowchart showing a first example of display control of the wash execution button performed by each constituent element of the display control device 100. The control of the first example is to display the wash execution button on the display device 13 when the wash execution button is not displayed on the display device 13, and it is desirable to wash the vehicle-mounted sensor 11. The display control process for the wash execution button according to the first example shown in FIG. 3 is started when the ignition of the vehicle is turned on (IG-ON), and is repeatedly executed until the ignition is turned off (IG-OFF).

In step S301, the wash restriction determining unit 104 determines whether the vehicle is in the wash restricted state. The wash restricted state is a state in which washing of the vehicle-mounted sensor 11 is inhibited or a state in which the washing effect of the vehicle-mounted sensor 11 cannot be sufficiently obtained, as described above. When the wash restriction determining unit 104 determines that the vehicle is not in the wash restricted state (step S301, NO), the control proceeds to step S302. When the wash restriction determining unit 104 determines that the vehicle is in the wash restricted state (step S301, YES), the determining operation of the step S301 is repeatedly executed.

In step S302, the control unit 102 determines the status of the wash SW display setting as information concerning the possibility of displaying the wash execution button. Namely, the control unit 102 determines whether the wash SW display setting is ON indicating that the display device 13 is permitted to display the wash execution button, or OFF indicating that the display device 13 is inhibited from displaying the wash execution button. When the control unit 102 determines that the wash SW display setting is ON (step S302, ON), the control proceeds to step S303. When the control unit 102 determines that the wash SW display setting is OFF (step S302, OFF), the process proceeds to step S301.

In step S303, the control unit 102 determines whether the receiving unit 101 has received the dirt detection information from the detection device 12. The dirt detection information may not include information (e.g., dirt level) concerning the degree of dirtiness. When the control unit 102 determines that the receiving unit 101 has received the dirt detection information (step S303, YES), the control proceeds to step S304. When the control unit 102 determines that the receiving unit 101 has not received the dirt detection information (step S303, NO), the control proceeds to step S301.

In step S304, the control unit 102 makes a request (display request) to display the wash execution button (a software switch), to the display device 13. As a result, on the display device 13, the wash execution button as illustrated by way of example in FIG. 2A or FIG. 2B is displayed. After the display request for the wash execution button is made, the control returns to step S301. When the control unit 102 detects that the wash execution button is selected during display of the wash execution button, the instruction unit 103 instructs the washing device 14 to wash the vehicle-mounted sensor 11.

(2) Second Example

FIG. 4 is a processing flowchart showing a second example of display control for the wash execution button performed by each constituent element of the display control device 100. The control of the second example is to highlight the displayed wash execution button when the wash execution button has already been displayed on the display device 13, and it is desirable to wash the vehicle-mounted sensor 11. The display control process for the wash execution button according to the second example of FIG. 4 is started when the ignition of the vehicle is turned on (IG-ON), and is repeatedly executed when the ignition is turned off (IG-OFF).

In step S401, the wash restriction determining unit 104 determines whether the vehicle is in the wash restricted state. The wash restricted state is a state in which washing of the vehicle-mounted sensor 11 is inhibited or a state in which the washing effect of the vehicle-mounted sensor 11 cannot be sufficiently obtained, as described above. When the wash restriction determining unit 104 determines that the vehicle is not in the wash restricted state (step S401, NO), the control proceeds to step S402. When the wash restriction determining unit 104 determines that the vehicle is in the wash restricted state (step S401, YES), the determining operation of the step S401 is repeatedly executed.

In step S402, the control unit 102 determines the status of the wash SW display setting as information concerning the possibility of displaying the wash execution button. Namely, the control unit 102 determines whether the wash SW display setting is ON indicating that the display device 13 is permitted to display the wash execution button, or OFF indicating that the display device 13 is inhibited from displaying the wash execution button. When the control unit 102 determines that the wash SW display setting is ON (step S402, ON), the control proceeds to step S403. When the control unit 102 determines that the wash SW display setting is OFF (step S402, OFF), the process proceeds to step S401.

In step S403, the control unit 102 makes a request (display request) to display the wash execution button (a software switch), to the display device 13. As a result, on the display device 13, the wash execution button as illustrated by way of example in FIG. 2A or FIG. 2B is displayed. After the display request for the wash execution button is made, the control proceeds to step S404. When the control unit 102 detects that the wash execution button is selected during display of the wash execution button, the instruction unit 103 instructs the washing device 14 to wash the vehicle-mounted sensor 11.

In step S404, the control unit 102 determines whether the receiving unit 101 has received the dirt detection information from the detection device 12. The dirt detection information may not include information (e.g., dirt level) concerning the degree of dirtiness. When the control unit 102 determines that the receiving unit 101 has received the dirt detection information (step S404, YES), the control proceeds to step S405. When the control unit 102 determines that the receiving unit 101 has not received the dirt detection information (step S404, NO), the control proceeds to step S401.

In step S405, the control unit 102 makes a request (highlighting request) to highlight the already displayed wash execution button (software switch) with a predetermined drawing pattern, to the display device 13. The drawing pattern is intended to direct the attention of the vehicle driver to the wash execution button. FIG. 7A through FIG. 7G show examples of the drawing patterns for highlighting the wash execution button (the icon display switch 13b of FIG. 2B).

Figure 7A:
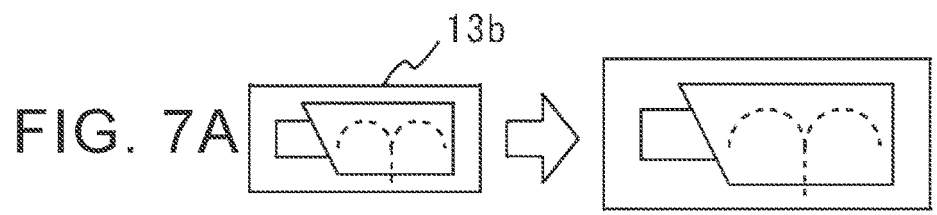
FIG. 7A is a view showing one example of a drawing pattern for highlighting the wash execution button.
Figure 7B:
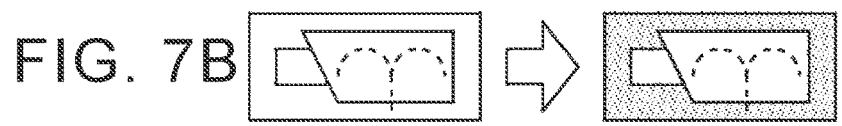
FIG. 7B is a view showing one example of a drawing pattern for highlighting the wash execution button.
Figure 7C:
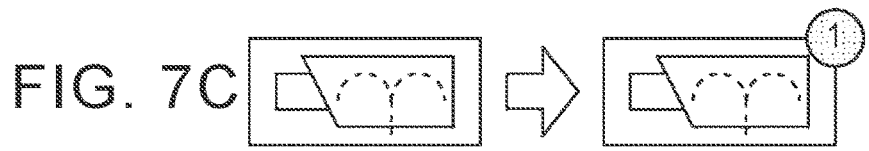
FIG. 7C is a view showing one example of a drawing pattern for highlighting the wash execution button.
Figure 7D:
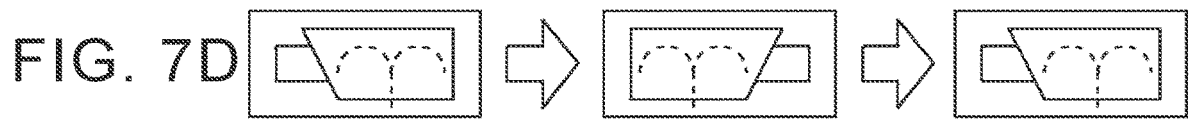
FIG. 7D is a view showing one example of a drawing pattern for highlighting the wash execution button.
Figure 7E:
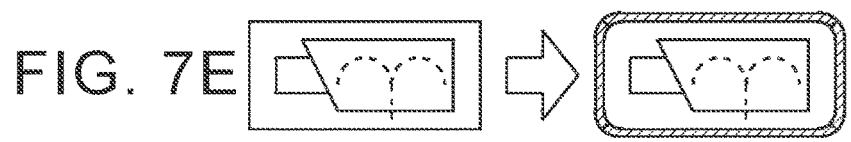
FIG. 7E is a view showing one example of a drawing pattern for highlighting the wash execution button.
Figure 7F:
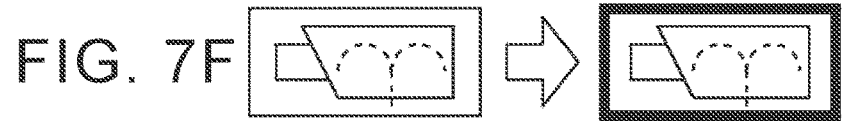
FIG. 7F is a view showing one example of a drawing pattern for highlighting the wash execution button.
Figure 7G:
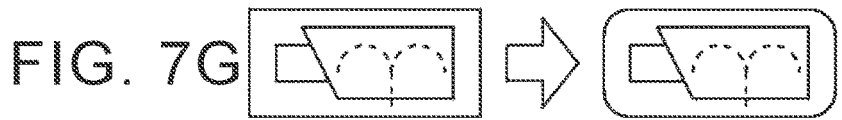
FIG. 7G is a view showing one example of a drawing pattern for highlighting the wash execution button.

The following are some examples of drawing patterns.
(FIG. 7A) Drawing pattern that changes the size of the wash execution button. In the example of FIG. 7A, the size of the icon display switch 13b is made larger.
(FIG. 7B) Drawing pattern that changes the color of the wash execution button. In the example of FIG. 7B, the background color of the icon display switch 13b is made different from the color of the icon.
(FIG. 7C) Drawing pattern indicating that there is a notification on the wash execution button. In the example of FIG. 7C, a badge is displayed in the upper right corner of the icon display switch 13b.
(FIG. 7D) Drawing pattern that adds motion (effect) to the display of the wash execution button. In the example of FIG. 7D, the icon display switch 13b is periodically flipped. In addition to flipping, the motion may be rotation, blinking, or wave.
(FIG. 7E) Drawing pattern that makes the wash execution button three-dimensional. In the example of FIG. 7E, the icon display switch 13b is displayed as if it were popping out of the screen.
(FIG. 7F) Drawing pattern that changes the frame of the wash execution button. In the example of FIG. 7F, the outer frame of the icon display switch 13b is thickened. In addition to the thickness, other changes such as blinking may be used.
(FIG. 7G) Drawing pattern that changes the design of the wash execution button. In the example of FIG. 7G, the icon display switch 13b is changed to a design with rounded corners.

Drawing pattern that moves the display position of the wash execution button. For example, the icon display switch 13b displayed in the upper right corner of FIG. 2B is moved to the center of the screen of the display device 13 and displayed.

Each of the above-described drawing patterns may be implemented alone, or some of the drawing patterns may be combined and implemented.

With the wash execution button thus highlighted and displayed, it is possible to alert the vehicle driver that the vehicle-mounted sensor 11 is dirty, which in turn can encourage the driver to perform the washing of the vehicle-mounted sensor 11. After the highlighting request for the wash execution button is made, the control returns to step S401. When the control unit 102 detects selection of the wash execution button while the wash execution button is highlighted and displayed with any of the above drawing patterns, the instruction unit 103 instructs the washing device 14 to wash the vehicle-mounted sensor 11.

(3) Third Example

FIG. 5 is a processing flowchart showing a third example of display control of the wash execution button performed by each constituent element of the display control device 100. The control of the third example is to display and highlight the wash execution button on the display device 13 in the form of a drawing pattern according to the degree of dirtiness of the vehicle-mounted sensor 11 when the wash execution button is not displayed on the display device 13 and it is desirable to wash the vehicle-mounted sensor 11. The display control process for the wash execution button according to the third example shown in FIG. 5 is started when the vehicle ignition is turned on (IG-ON), and is repeatedly executed until the ignition is turned off (IG-OFF).

In step S501, the wash restriction determining unit 104 determines whether the vehicle is in the wash restricted state. The wash restricted state is a state in which washing of the vehicle-mounted sensor 11 is inhibited or a state in which the washing effect of the vehicle-mounted sensor 11 cannot be sufficiently obtained, as described above. When the wash restriction determining unit 104 determines that the vehicle is not in the wash restricted state (step S501, NO), the control proceeds to step S502. When the wash restriction determining unit 104 determines that the vehicle is in the wash restricted state (step S501, YES), the determining operation of the step S501 is repeatedly executed.

In step S502, the control unit 102 determines whether the receiving unit 101 has received the dirt detection information from the detection device 12. The dirt detection information includes information (e.g., dirt level) concerning the degree of dirtiness. When the control unit 102 determines that the receiving unit 101 has received the dirt detection information (step S502, YES), the control proceeds to step S503. When the control unit 102 determines that the receiving unit 101 has not received the dirt detection information (step S502, NO), the control proceeds to step S501.

In step S503, the control unit 102 determines whether the dirt of the vehicle-mounted sensor 11 satisfies a predetermined condition, based on the dirt detection information received by the receiving unit 101. This determination is made so as to recognize the degree of dirtiness of the vehicle-mounted sensor 11. For example, when the dirt level included in the dirt detection information is equal to or higher than "dirt level 2", the control unit 102 can determine that the dirt satisfies the predetermined condition. In addition to the dirt level, the predetermined condition may appropriately use a parameter commensurate with the degree of dirtiness included in the dirt detection information. When the control unit 102 determines that the dirt of the vehicle-mounted sensor 11 satisfies the predetermined condition (step S503, YES), the control proceeds to step S506. When the dirt of the vehicle-mounted sensor 11 does not satisfy the predetermined condition (step S503, NO), the control proceeds to step S504.

In step S504, the control unit 102 determines the status of the wash SW display setting as information concerning the possibility of displaying the wash execution button. Namely, the control unit 102 determines whether the wash SW display setting is ON indicating that the display device 13 is permitted to display the wash execution button, or OFF indicating that the display device 13 is inhibited from displaying the wash execution button. When the control unit 102 determines that the wash SW display setting is ON (step S504, ON), the control proceeds to step S505. When the control unit 102 determines that the wash SW display setting is OFF (step S504, OFF), the process proceeds to step S501.

In step S505, the control unit 102 makes a request (first highlighting request) to display the wash execution button (software switch) in the mode of a first drawing pattern, to the display device 13. As a result, on the display device 13, the wash execution button as illustrated in FIG. 2A or FIG. 2B is displayed with any one or two or more of the drawing patterns illustrated in FIG. 7A to FIG. 7G. As the first drawing pattern, the one that alerts the driver of the vehicle to a lesser degree than a second drawing pattern (which will be described later) is set. For example, change of the size of the wash execution button, change of the color of the wash execution button, etc. can be set as the first drawing pattern. After the first highlighting request for the wash execution button is made, the control returns to step S501.

In step S506, the control unit 102 makes a request (second highlighting request) to display the wash execution button (software switch) in the mode of the second drawing pattern, to the display device 13. As a result, on the display device 13, the wash execution button as illustrated in FIG. 2A or FIG. 2B is displayed in any one or two or more of the drawing patterns illustrated in FIG. 7A to FIG. 7G. As the second drawing pattern, the one that alerts the driver of the vehicle more strongly than the above first drawing pattern is set. For example, change of the motion of the wash execution button, movement of the display position of the wash execution button, etc. can be set as the second drawing pattern. After the second highlighting request for the wash execution button is made, the control returns to step S501.

When the control unit 102 detects that the wash execution button is selected while the wash execution button is highlighted with any of the drawing patterns, the instruction unit 103 instructs the washing device 14 to wash the vehicle-mounted sensor 11.

(4) Fourth Example

Figure 6:
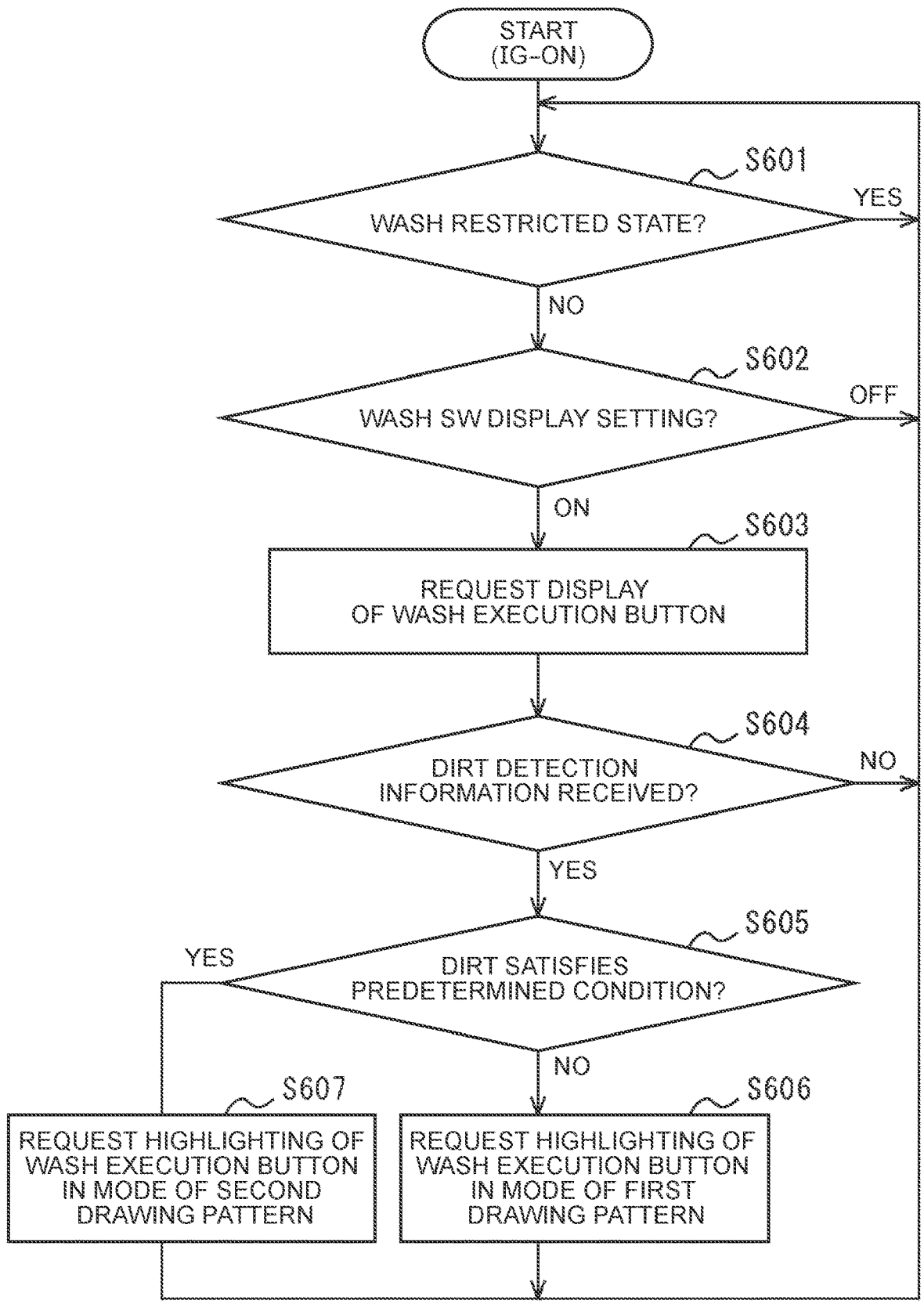
FIG. 6 is a processing flowchart of a fourth example of wash execution button display control.

FIG. 6 is a processing flowchart showing a fourth example of display control of the wash execution button performed by each constituent element of the display control device 100. The control of the fourth example is to highlight the displayed wash execution button in the mode of the drawing pattern according to the degree of dirtiness of the vehicle-mounted sensor 11 when the wash execution button is already displayed on the display device 13, and it is desirable to wash the vehicle-mounted sensor 11. The display control process for the wash execution button according to the fourth example shown in FIG. 6 is started when the vehicle ignition is turned on (IG-ON), and is repeatedly executed until the ignition is turned off (IG-OFF).

In step S601, the wash restriction determining unit 104 determines whether the vehicle is in the wash restricted state. The wash restricted state is a state in which washing of the vehicle-mounted sensor 11 is inhibited or a state in which the washing effect of the vehicle-mounted sensor 11 cannot be sufficiently obtained, as described above. When the wash restriction determining unit 104 determines that the vehicle is not in the wash restricted state (step S601, NO), the control proceeds to step S602. When the wash restriction determining unit 104 determines that the vehicle is in the wash restricted state (step S601, YES), the determining operation of the step S601 is repeatedly executed.

In step S602, the control unit 102 determines the status of the wash SW display setting as information concerning the possibility of displaying the wash execution button. Namely, the control unit 102 determines whether the wash SW display setting is ON indicating that the display device 13 is permitted to display the wash execution button, or OFF indicating that the display device 13 is inhibited from displaying the wash execution button. When the control unit 102 determines that the wash SW display setting is ON (step S602, ON), the control proceeds to step S603. When the control unit 102 determines that the wash SW display setting is OFF (step S602, OFF), the control proceeds to step S601.

In step S603, the control unit 102 makes a request (display request) to display the wash execution button (software switch), to the display device 13. As a result, on the display device 13, the wash execution button as illustrated by way of example in FIG. 2A or FIG. 2B is displayed. When the display request for the wash execution button is made, the control proceeds to step S604. When the control unit 102 detects that the wash execution button is selected during display of the wash execution button, the instruction unit 103 instructs the washing device 14 to wash the vehicle-mounted sensor 11.

In step S604, the control unit 102 determines whether the receiving unit 101 has received the dirt detection information from the detection device 12. The dirt detection information includes information (e.g., dirt level) concerning the degree of dirtiness. When the control unit 102 determines that the receiving unit 101 has received the dirt detection information (step S604, YES), the control proceeds to step S605. When the control unit 102 determines that the receiving unit 101 has not received the dirt detection information (step S604, NO), the control proceeds to step S601.

In step S605, the control unit 102 determines whether the dirt of the vehicle-mounted sensor 11 satisfies a predetermined condition, based on the dirt detection information received by the receiving unit 101. This determination is made so as to recognize the degree of dirtiness of the vehicle-mounted sensor 11. For example, when the dirt level included in the dirt detection information is equal to or higher than "dirt level 2", the control unit 102 can determine that the dirt satisfies the predetermined condition. In addition to the dirt level, the predetermined condition may appropriately use a parameter commensurate with the degree of dirtiness included in the dirt detection information. When the control unit 102 determines that the dirt of the vehicle-mounted sensor 11 satisfies the predetermined condition (step S605, YES), the control proceeds to step S607. When the control unit 102 determines that the dirt of the vehicle-mounted sensor 11 does not satisfy the predetermined condition (step S605, NO), the control proceeds to step S606.

In step S606, the control unit 102 makes a request (first highlighting request) to highlight the already displayed wash execution button (software switch) in the mode of the first drawing pattern, to the display device 13. As a result, on the display device 13, the wash execution button as illustrated in FIG. 2A or FIG. 2B is highlighted with any one or two or more of the drawing patterns illustrated in FIG. 7A to FIG. 7G. The first drawing pattern has been described above. After the first highlighting request for the wash execution button is made, the control returns to step S601.

In step S607, the control unit 102 makes a request (second highlighting request) to highlight the already displayed wash execution button (software switch) in the mode of the second drawing pattern, to the display device 13. As a result, on the display device 13, the wash execution button as illustrated in FIG. 2A or FIG. 2B is highlighted with any one or two or more of the drawing patterns illustrated in FIG. 7A to FIG. 7G. The second drawing pattern has been described above. After the second highlighting request for the wash execution button is made, the control returns to step S601.

When the control unit 102 detects that the wash execution button is selected while the wash execution button is highlighted with any of the drawing patterns, the instruction unit 103 instructs the washing device 14 to wash the vehicle-mounted sensor 11.

While the first example through the fourth example of the display control process for the wash execution button performed by each constituent element of the display control device 100 have been described above, step S301, step S401, step S501, and step S601 of the respective processes are omitted when the wash restriction determining unit 104 is not installed in the display control device 100.

Operation and Effects

As described above, the display control device 100 according to one embodiment of the disclosure determines whether a request to display the wash execution button is made to the display device 13 or a request to highlight the display is made, based on the dirt detection information concerning dirt of the vehicle-mounted sensor 11 detected by the detection device 12. Thus, the display device 13 can perform display or highlighting of the wash execution button for the vehicle-mounted sensor 11 at more appropriate times. Also, the wash execution button is displayed when the dirt of the vehicle-mounted sensor 11 is detected, rather than displayed at all times, or the wash execution button displayed at all times is highlighted when the dirt of the vehicle-mounted sensor 11 is detected. These arrangements give the user a less complicated impression, and can save the number of software switches displayed on the display screen.

The display control device 100 according to this embodiment may include the wash restriction determining unit 104. Thus, the display control device 100 does not make a request to display the wash execution button or a request to highlight the display, to the display device 13, when washing of the vehicle-mounted sensor 11 is inhibited by the vehicle traveling control in progress, or the dirt detected by the detection device 12 cannot be effectively removed through washing of the vehicle-mounted sensor 11. Thus, the wash execution button is less likely or unlikely to be displayed or highlighted on the display device 13 even though washing is inhibited, and the vehicle-mounted sensor 11 is less likely or unlikely to be washed even though the effect of washing cannot be obtained.

While one embodiment of the disclosure has been described above, the disclosure can be regarded as a display control device, a method executed by the display control device including a processor and a memory, a control program for executing this method, a computer-readable non-transitory storage medium that stores the control program, and a vehicle in which the display control device is installed.

The display control device of the disclosure can be used for a vehicle equipped with a vehicle-mounted sensor, such as a vehicle-mounted camera, and a washing device of the vehicle-mounted sensor, for example.

What is claimed is:

1. A display control device installed in a vehicle, the display control device comprising a processor
    configured to execute
    receiving dirt detection information concerning dirt of a vehicle-mounted sensor installed in the vehicle;
    receiving a permission from a user for displaying or highlighting a wash execution button displayed on a display installed in the vehicle for executing washing of the vehicle-mounted sensor;
    controlling display of the wash execution button based on the dirt detection information and the permission;
    determining whether dirt adheres to the vehicle-mounted sensor after washing based on the dirt detection information from the environmental images captured by the vehicle-mounted sensor;
    when the processor receives the dirt detection information and the permission, and when the processor determines that dirt adheres to the vehicle-mounted sensor, displaying the wash execution button; and
    when the processor determines that dirt does not adhere to the vehicle-mounted sensor, not displaying the wash execution button.

2. The display control device according to claim 1, wherein the processor is configured to execute changing a mode of display of the wash execution button displayed on the display, based on the information concerning the dirt.

3. The display control device according to claim 2, wherein the processor is configured to execute highlighting the wash execution button displayed on the display when the information concerning the dirt satisfies a predetermined condition, compared to when the information concerning the dirt does not satisfy the predetermined condition.

4. The display control device according to claim 1, wherein, when the information concerning the dirt satisfies a predetermined condition, the processor is configured to execute causing the display to display the wash execution button or highlight and display the wash execution button, irrespective of the information concerning the permission by the user of display of the wash execution button.

5. The display control device according to claim 1, wherein the processor is configured to execute instructing a washing device comprising a pump and a washing nozzle installed in the vehicle to wash the vehicle-mounted sensor, when selection of the wash execution button is detected.

6. A display comprising the display control device according to claim 1.

7. The vehicle including the display according to claim 6.

8. A method implemented by a computer of a display control device installed in a vehicle, the method comprising:
   receiving dirt detection information concerning dirt of a vehicle-mounted sensor installed in the vehicle;
   receiving a permission from a user for displaying or highlighting a wash execution button displayed on a display installed in the vehicle for executing washing of the vehicle-mounted sensor;
   controlling display of the wash execution button based on the received dirt detection information and the permission;
   determining whether dirt adheres to the vehicle-mounted sensor after washing based on the dirt detection information from the environmental images captured by the vehicle-mounted sensor;
   when the processor receives the dirt detection information and the permission, and when the processor determines that dirt adheres to the vehicle-mounted sensor, displaying the wash execution button; and
   when the processor determines that dirt does not adhere to the vehicle-mounted sensor, not displaying the wash execution button.

9. A non-transitory storage medium storing a program executed by a computer of a display control device installed in a vehicle, the program comprising:
   receiving dirt detection information concerning dirt of a vehicle-mounted sensor installed in the vehicle;
   receiving a permission from a user for displaying or highlighting a wash execution button displayed on a display installed in the vehicle for executing washing of the vehicle-mounted sensor;
   controlling display of the wash execution button based on the received dirt detection information and the permission;
   determining whether dirt adheres to the vehicle-mounted sensor after washing based on the dirt detection information from the environmental images captured by the vehicle-mounted sensor;
   when the processor receives the dirt detection information and the permission, and when the processor determines that dirt adheres to the vehicle-mounted sensor, displaying the wash execution button; and
   when the processor determines that dirt does not adhere to the vehicle-mounted sensor, not displaying the wash execution button.

10. The display control device according to claim 1, wherein the processor is configured to execute determining whether the vehicle mounted sensor is being used under a traveling control of the vehicle, and
   when the vehicle mounted sensor is determined to be used under the traveling control, the processor is configured to execute inhibiting displaying or highlighting the wash execution button.

* * * * *

UNITED STATES PATENT AND TRADEMARK OFFICE
CERTIFICATE OF CORRECTION

| | | |
|---|---|---|
| PATENT NO. | : 12,240,324 B2 | Page 1 of 1 |
| APPLICATION NO. | : 17/932758 | |
| DATED | : March 4, 2025 | |
| INVENTOR(S) | : Shimizu | |

It is certified that error appears in the above-identified patent and that said Letters Patent is hereby corrected as shown below:

On the Title Page

The following foreign priority data should be corrected as follows:
(30) Foreign Application Priority Data
Oct. 1, 2021 (JP)................................2021-163033
Jan. 27, 2022 (JP)..............................2022-011248

Signed and Sealed this
First Day of July, 2025

Coke Morgan Stewart
*Acting Director of the United States Patent and Trademark Office*